United States Patent [19]

Giese

[11] Patent Number: 4,702,279

[45] Date of Patent: Oct. 27, 1987

[54] VALVE TO CONTROL THE RATE AND SHAPE OF A FLUID STREAM

[75] Inventor: John D. Giese, Berkeley, Calif.

[73] Assignee: Mepaco, Inc., Oakland, Calif.

[21] Appl. No.: 680,175

[22] Filed: Dec. 10, 1984

[51] Int. Cl.⁴ ................................................ F16K 5/10
[52] U.S. Cl. ............................ 137/625.17; 137/625.3; 251/120
[58] Field of Search ................................ 251/120, 118; 137/625.3, 625.17

[56] References Cited

U.S. PATENT DOCUMENTS

| | | | |
|---|---|---|---|
| 2,642,254 | 6/1953 | Armstrong | 137/625.3 X |
| 2,995,894 | 8/1961 | Baxter et al. | 137/625.17 X |
| 3,349,798 | 10/1967 | Allen | 137/625.3 X |

Primary Examiner—Arnold Rosenthal
Attorney, Agent, or Firm—Glen R. Grunewald; Thomas R. Lampe

[57] ABSTRACT

A valve to regulate the flow rate and the shape of a fluid stream which includes two nestings cylinders each having elongated slots with one cylinder being rotatable between a position where the slots superimpose and where the slots do not superimpose and being slidable between a position where the slots are axially aligned and a position where the slots are not axially aligned.

1 Claim, 4 Drawing Figures

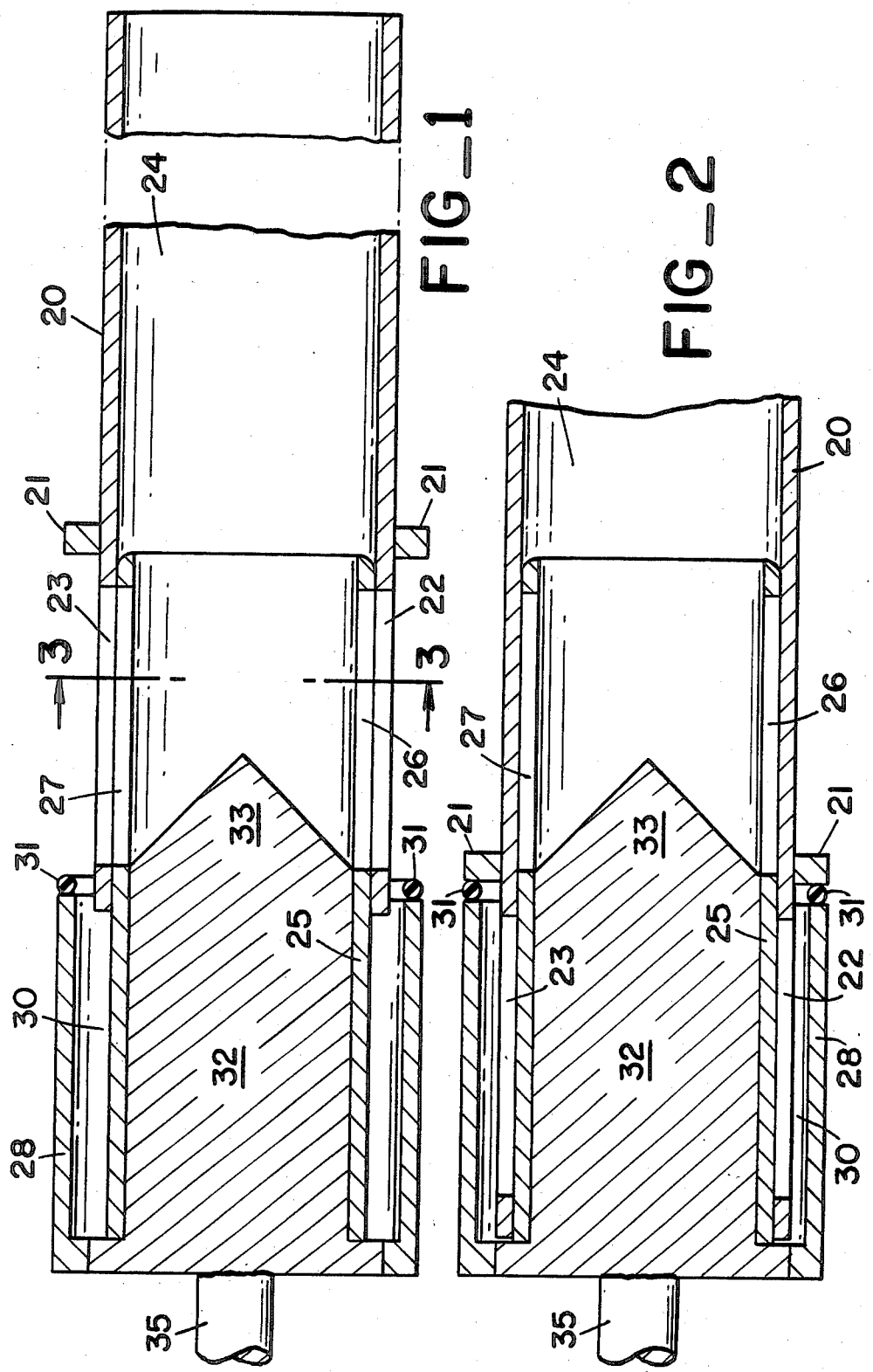

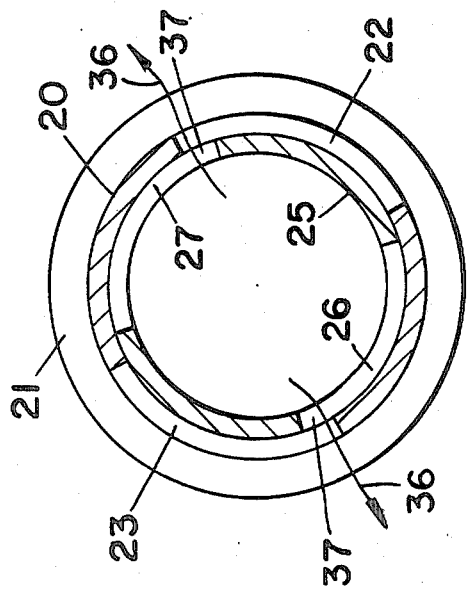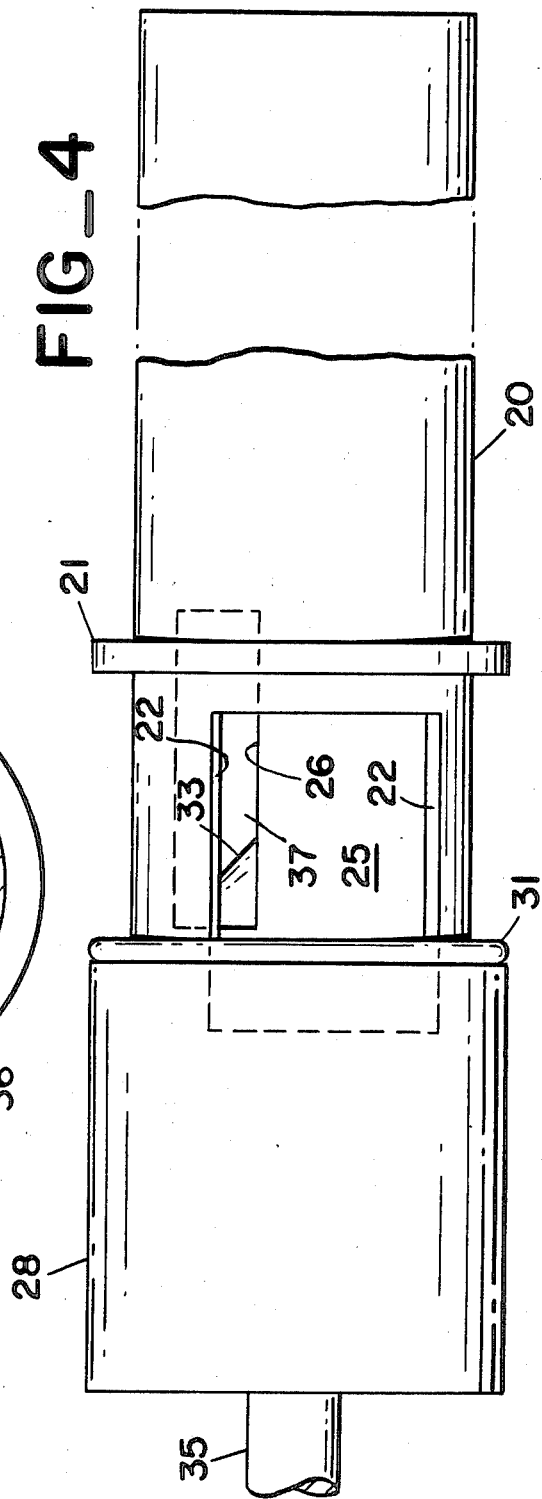

VALVE TO CONTROL THE RATE AND SHAPE OF A FLUID STREAM

BACKGROUND OF THE INVENTION

In preparing sausage meat for being stuffed into casings it is desirable to deaerate it. The presence of oxygen in the meat increases its rate of deterioration and removal of air produces a denser product, both of which are desirable.

Deaeration has been accomplished in the past by placing sausage meat in a vacuum chamber prior to packing it in casings. In order to deaerate the meat it must be subjected to the vacuum for the time necessary for air to diffuse to the surface of the meat and be carried away. Diffusion is hastened by stirring the meat in the vacuum chamber. In order to provide adequate deaeration, particularly in a continuous process of charging the vacuum chamber with meat and removing deaerated meat to sausage stuffing equipment, vacuum chambers have required a stirrer and a capacity to hold a large quantity of meat.

Diffusion time can be diminshed if meat is introduced into the vacuum chamber as a thin film. It is known to discharge meat into a vacuum chamber through a thin slit in the side of the chamber whereby the meat enters the chamber as a film. Although this method is successful for hastening the deaeration of meat, it has drawbacks.

Some sausage meat is made of very finely subdivided particles having a very homogenous texture, somewhat like mayonaise or peanut butter. Such sausage meat passes easily through a very narrow slit as a stream in the form of a thin film. Other sausage meat has chunks of meat ranging in size up to an inch or more in major dimension. A slit thin enough to make an adequate film of finely subdivided meat will not pass meat having larger particles. A very wide slit capable of handling meat with large particles will not make an adequatly thin film for deaerating meat having very finely subdivided particles.

Even if a slit of the proper width is used, the rate of feed to the vacuum must be controlled so that it approximately equals the rate that meat is withdrawn from the vacuum chamber and passed through a sausage stuffing process. If the flow rate through the slit is too small the shape of the stream will be improper and for a given size slit the maximum flow rate is limited.

SUMMARY OF THE INVENTION

This invention is a valve that controls both the volume and the shape of a fluid stream discharging through it. The valve of this invention can produce a stream in the form of a film in which the thickness can be varied from the maximum opening of valve to a film that is so thin that virtually a no flow situation exists. The valve of this invention also can vary the volume of fluid passing through it at any given film thickness from the maximum volume that can pass through the valve to a no flow setting.

The valve of this invention includes two valve elements which are in sliding contact with respect to one another. The first of the valve elements is fixed and the other is movable. Each valve element has an elongated passageway or slit through which fluid passes. The long axis of the slits of the two valve elements are parallel. The second valve element is movable with respect to the first valve element both in a direction parallel to the long axis of the slits and in a direction perpendicular to the long axis of the slits. The valve elements may be flat or curved and in a preferred embodiment they are in the form of nesting cylinders.

BRIEF DESCRIPTION OF THE DRAWINGS

FIG. 1 is a cross section of a valve embodying this invention shown in maximum open position for a given setting;

FIG. 2 is a cross section of the valve of FIG. 1 shown in a closed position;

FIG. 3 is a cross section of the valve of FIG. 1 taken along the line 3—3 and in the direction of the arrow;

FIG. 4 is a plan view of the valve of FIG. 1 in a partly opened position.

DETAILED DESCRIPTION OF THE DRAWINGS

The drawings illustrate a valve embodying this invention. The valve of the drawings is in the form of two, nesting cylinders. An outer cylinder 20 is provided with a flange 21. The valve also has a rectangular opening 22 and a rectangular opening 23. The outer cylinder will normally be fixed to the wall of a vessel by welding or with a threaded connection so that the inlet 24 is outside of the vessel while the openings 22 and 23 are inside of the vessel.

The illustrated valve includes an inner cylinder 25 which is provided with rectangular openings 26 and 27. The inner cylinder fits within the outer cylinder so that the inner cylindrical surface of the outer cylinder and the outer cylindrical surface of the inner cylinder are in sliding contact that is sufficiently close to provide a seal for the fluid flowing through the valve. The inner cylinder 25 has an end plug 32 that terminates in a sloping surface portion 33. The sloping surfaces may be in the form of a pyramid or in the form of a straight ridge from which flat surfaces slope. In the illustrated embodiment a surrounding sealing cylinder 28 is provided which is spaced from cylinder 25 to form an annular space 30 that is wide enough to contain outer cylinder 20. The jacket 28 is provided with a seal 31 which normally will be an elastomeric gasket that bears against flange 21 when the valve is closed as will be hereinafter described.

The inner cylinder is manipulated by an operating handle 35 that is capable of being manipulated from outside of the vessel by moving either axially with respect to the inner cylinder or rotationally as will be described. FIGS. 3 and 4 illustrate an intermediate open position of the valve. The opening of the valve can be adjusted by both rotational movement of operating handle 35 and by axial movement of operating handle 35. Rotational movement of operating handle 35 primarily is employed to adjust the shape of the fluid stream passing through the valve. The valve adjusted as illustrated in FIGS. 3 and 4 has only a portion of openings 22 and 27 superimposing one another so that only a narrow slit 37 is available to pass fluid. When slit 37 is the right size to produce a fluid stream of the desired shape, the volume of fluid passing through that particular slit opening is adjusted by axial movement of operating handle 35 which limits the length of the opening 37. In the embodiment illustrated by limiting the openings 22, 23, 26 and 27 to a width occupying less than 90° of the angle of rotation of the cylinders, the valve may be closed either by rotating cylinder 26 until opening 37 is completely closed or by moving operating handle 35 axially to the position shown in FIG. 2 in which case no portion of the openings are superimposed.

What is claimed is:

1. A valve to control the volume and thickness of an elongated liquid stream comprising:
   a first valve element having a first, rectangular, elongated passageway,
   a second valve element having a second, rectangular, elongated passageway, said second valve element being oriented with the long axis of said second passageway parallel to the long axis of said first passageway and being in sliding contact with said first valve element, and said second valve element including a closure having a sloping surface with its base approximately at the extremity of said second elongated passageway,
   means to move said second valve element in a direction parallel with the long axis of said first passageway whereby the volume of said liquid stream may be controlled, and
   means to move said second valve element in a direction perpendicular to the long axis of said first passageway whereby the thickness and the volume of said liquid stream may be controlled.

* * * * *

UNITED STATES PATENT AND TRADEMARK OFFICE
CERTIFICATE OF CORRECTION

PATENT NO. : 4,702,279
DATED : Oct. 27, 1987
INVENTOR(S) : John D. Giese

It is certified that error appears in the above-identified patent and that said Letters Patent are hereby corrected as shown below:

Column 1, line 43, after "vacuum" insert --chamber--.

Signed and Sealed this

Sixth Day of December, 1988

Attest:

DONALD J. QUIGG

*Attesting Officer*  *Commissioner of Patents and Trademarks*